(12) United States Patent
Chang

(10) Patent No.: US 10,964,174 B1
(45) Date of Patent: Mar. 30, 2021

(54) STORED-VALUE CARD MACHINE

(71) Applicant: Top Vending Machine Electronics Co., Ltd., Taoyuan (TW)

(72) Inventor: Yuan-Fong Chang, Taoyuan (TW)

(73) Assignee: Top Vending Machine Electronics Co., Ltd., Taoyuan (TW)

( * ) Notice: Subject to any disclaimer, the term of this patent is extended or adjusted under 35 U.S.C. 154(b) by 0 days.

(21) Appl. No.: 16/716,569

(22) Filed: Dec. 17, 2019

(51) Int. Cl.
| G06K 5/00 | (2006.01) |
| G06F 7/08 | (2006.01) |
| G07F 17/42 | (2006.01) |
| G06Q 20/28 | (2012.01) |
| G06Q 20/34 | (2012.01) |

(52) U.S. Cl.
CPC ............. *G07F 17/42* (2013.01); *G06Q 20/28* (2013.01); *G06Q 20/342* (2013.01); *G06Q 20/354* (2013.01)

(58) Field of Classification Search
USPC .......................... 235/379, 380, 381, 475, 483
See application file for complete search history.

(56) References Cited

U.S. PATENT DOCUMENTS

| 4,040,097 A | * | 8/1977 | Mizuno | G06K 7/084 |
| | | | | 360/2 |
| 5,155,342 A | * | 10/1992 | Urano | G06Q 20/3433 |
| | | | | 235/380 |
| 5,917,177 A | * | 6/1999 | Owa | G06K 7/0021 |
| | | | | 235/379 |
| 6,012,635 A | * | 1/2000 | Shimada | G06Q 20/3576 |
| | | | | 235/380 |
| 6,169,975 B1 | * | 1/2001 | White | G06K 7/084 |
| | | | | 705/44 |
| 7,175,083 B2 | * | 2/2007 | Terashima | G06K 13/08 |
| | | | | 235/439 |
| 2011/0042403 A1 | * | 2/2011 | Martin | B65H 1/06 |
| | | | | 221/1 |
| 2011/0266346 A1 | * | 11/2011 | Ohta | G06K 13/08 |
| | | | | 235/449 |
| 2019/0012583 A1 | * | 1/2019 | Ohta | G06K 13/06 |

* cited by examiner

*Primary Examiner* — Tuyen K Vo
(74) *Attorney, Agent, or Firm* — Alan D. Kamrath; Karin L. Williams; Mayer & Williams PC

(57) ABSTRACT

A stored-value card machine includes a card output device including a body unit and a read/write device. The body unit includes a body and a transmission device mounted in the body. The body includes a card outlet in a front end thereof and a card inlet in a rear end thereof. The body further includes a card passageway having two ends intercommunicating with the card outlet and the card inlet, respectively. The transmission device includes two front transmission wheels and two rear transmission wheels located at the two ends of the passageway, respectively. The read/write device is mounted above an intermediate portion of the card passageway. The read/write device includes a read/write seat, a reader/writer mounted in the read/write seat, and a driver mounted in the read/write seat. The driver is configured to move the reader/writer downwards into the card passageway or upwards out of the card passageway.

13 Claims, 18 Drawing Sheets

STORED-VALUE CARD MACHINE

BACKGROUND OF THE INVENTION

The present invention relates to a stored-value card machine and, more particularly, to a stored-value card machine capable of adding value through precise reading/writing by a reader/writer while vending cards.

With the progress of technology, conventional cash transaction has been gradually replaced by a consumption mode using stored-value cards. In vending of an ordinary stored-value card, a card is manually inserted into a card reader that writes information into the card, which is relatively inconvenient. In an approach, card vending machines have been developed to vend stored-value cards with a fixed value, which is a fixed-amount transaction. The consumers cannot purchase stored-value cards with the desired stored values. Thus, it is an important issue to permit a stored-value card machine to add an unfixed value into a card and to vend the card and to permit a consumer to add value to the card.

BRIEF SUMMARY OF THE INVENTION

The primary objective of the present invention is to provide a stored-value card machine using a card output device and a read/write device to proceed with reading/writing of cards, such that the stored-value card machine can vend cards of different types or different values while permitting adding value to a card of a consumer.

The secondary objective of the present invention is to push the reader/writer by a card to a position permitting the reader/writer to precisely contact with the card and to proceed with adding value through reading and writing, such that the stored-value card machine can vend cards of different types or different values while permitting adding value to a card of a consumer.

To achieve the above objectives, the present invention provides a stored-value card machine comprising a card output device including a body unit and a read/write device. The body unit includes a body and a transmission device mounted in the body. The body includes a card outlet in a front end thereof and a card inlet in a rear end thereof. The body further includes a card passageway having two ends intercommunicating with the card outlet and the card inlet, respectively. The transmission device includes two front transmission wheels and two rear transmission wheels located at the two ends of the passageway, respectively. The read/write device is mounted above an intermediate portion between the two ends of the card passageway. The read/write device includes a read/write seat, a reader/writer mounted in the read/write seat, and a driver mounted in the read/write seat. The driver is configured to move the reader/writer downwards into the card passageway or upwards out of the card passageway. Before the card output device outputs a card, the driver moves the reader/writer upwards out of the card passageway. After the card enters the card passageway via the card inlet, the transmission device pushes the card towards the card outlet. After the card passes through the reader/writer, the transmission device stops pushing the card, and the driver is activated to move the reader/writer downwards into the card passageway. Then, the transmission device moves the card towards the card inlet, thereby moving the card backwards to push the reader/writer to a position where the reader/writer is permitted to move downwards for precisely contacting with the card for proceeding with reading and writing.

In an example, the body unit further includes a detector mounted at a side of the body and configured to detect presence of the card in the card passageway.

In an example, the read/write seat includes a base and two lateral boards extending upwards from the base and spaced from each other. Each of the two lateral boards includes a guiding hole that is elongated. The reader/writer is disposed between the two lateral boards and includes a main board, two guiding pegs respectively extending from two sides of the main board, and a read/write head mounted to a bottom face of the main board. A stop portion extend downwards from an end of the main board. When the driver moves the reader/writer downwards, the read/write head and the stop portion enters the card passageway, such that the card pushes the stop portion towards the card inlet and is positioned, and the read/write head moves downwards to contact with the card and proceeds with reading and writing.

In an example, the read/write seat includes two first hooks respectively on the two lateral boards. The reader/writer includes two second hooks on the main board. Two elastic elements are provided, and each of the two elastic elements is attached between one of the two first hooks and one of the two second hooks, biasing the reader/writer upwards.

In an example, the driver is disposed on a side of one of the two lateral boards of the read/write seat. The driver includes a driving member and an actuating member. The driving member and the actuating member are separately and pivotably connected to the read/write seat. An end of the driving member is connected to an end of the actuating member. The actuating member includes an actuating portion pressing against the guiding peg received in the guiding hole of the one of the two lateral boards. When the driver drives the actuating member to pivot downwards, the actuating portion presses against and moves the guiding peg downwards along the guiding hole.

In an example, the driving member of the read/write device includes a connection seat, an electromagnetic valve, and an actuating rod. The connection seat is pivotably connected to the read/write seat. The electromagnetic valve is positioned on the connection seat. The actuating rod is connected to the electromagnetic valve and is configured to be driven by the electromagnetic valve to move towards or away from the electromagnetic valve. The actuating member includes an actuating groove remote to a pivotal connection between the actuating member and the read/write seat. An end of the actuating rod is slidably received in the actuating groove.

In an example, the actuating member includes a positioning hole between two ends thereof. The read/write seat includes a positioning hook adjacent to the pivotal connection between the actuating member and the read/write seat. An elastic element is attached between the positioning hook and the positioning hole to bias the actuating member to pivot upwards.

In an example, the stored-value card machine further comprises a card seat including a card receiving portion and a positioning portion extending from a side of the card receiving portion. The card output device is disposed on the positioning portion. The card receiving portion includes a partitioning board therein to form a receiving space above the partitioning board and a recovery space below the partitioning board. The receiving space is configured to receive a plurality of cards. The recovery space is configured to receive damaged cards. A push wheel is disposed on a bottom face of the partitioning board and is configured to move one of the plurality of cards in the receiving space out of the receiving space. The partitioning board is aligned with the card passageway. A first motor and a second motor are disposed in the positioning portion. The first motor is connected to the two front transmission wheels and the two rear transmission wheels via a first belt. The second motor is connected to the push wheel in the card receiving portion via a second belt.

In an example, the card seat includes a detecting device mounted to the bottom face of the partitioning board and configured to detect the plurality of cards received in the receiving space. A low inventory level detector is mounted at a side of the receiving space and above the partitioning board for detecting an inventory level of the plurality of cards received in the receiving space.

In an example, an adjusting device is disposed at another side of the receiving space and includes a fixing board, a limiting board, and an adjusting knob. An end of the limiting board is spaced from a surface of the partitioning board. The adjusting knob includes a cam having surfaces with different radii. At least one spring is attached to the limiting board to bias the limiting board upwards to abut against a bottom edge of the cam. The adjusting knob is configured to move the limiting board vertically to change a spacing between the end of the limiting board and the surface of the partitioning board.

In an example, a guiding board is pivotably connected to a bottom side of the partitioning board and includes a guiding portion and a recovery portion on two sides of a pivotal connection between the guiding board and the partitioning board. The guiding portion extends beyond a top surface of the partitioning board from a side of the partitioning board. The recovery portion is located below the partitioning board. The gravitational force acting on the recovery portion keeps the guiding portion beyond the top surface of the partitioning board.

In an example, the card seat includes an upper lid covering a top end of the card receiving portion, and a pressing board is received in the receiving space and abuts against the cards in the receiving space.

In an example, the card seat includes a recovery box slidably received in a lower portion of the card receiving portion. The recovery box includes a bottom wall, a front wall extending upwards from a front side of the bottom wall and a rear wall extending upwards from a rear side of the bottom wall. A guiding plate extends slantly from the front wall.

The present invention will become clearer in light of the following detailed description of illustrative embodiments of this invention described in connection with the drawings.

DETAILED DESCRIPTION OF THE INVENTION

With reference to FIGS. 1-10, a stored-value card machine of an embodiment according to the present invention includes a card output device 10 mounted in a card seat 3. The card output device 10 includes a body unit 1 and a read/write device 2.

Figure 1:
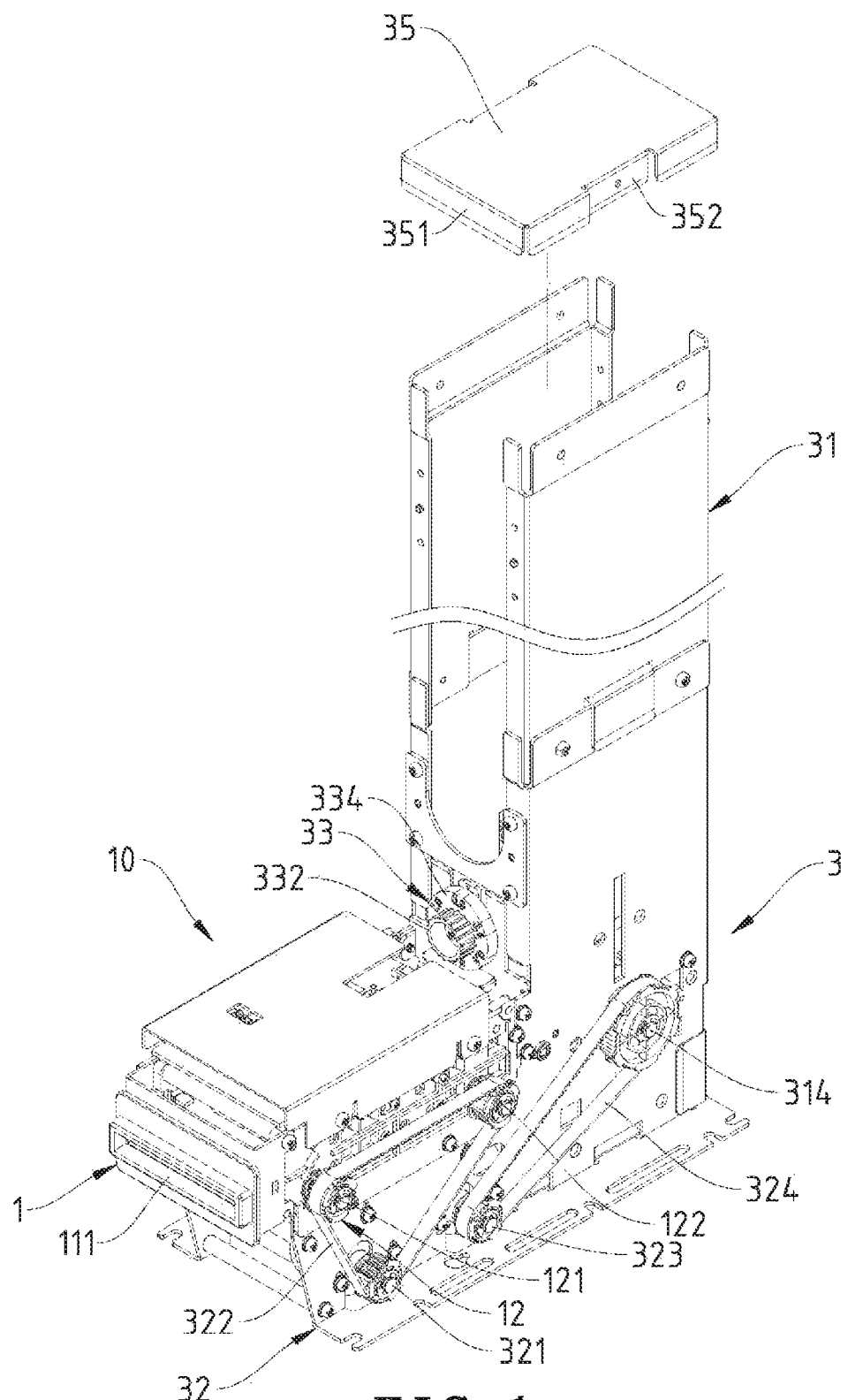
FIG. 1 is a partially exploded perspective view of a stored-value card machine of an embodiment according to the present invention.
Figure 2:
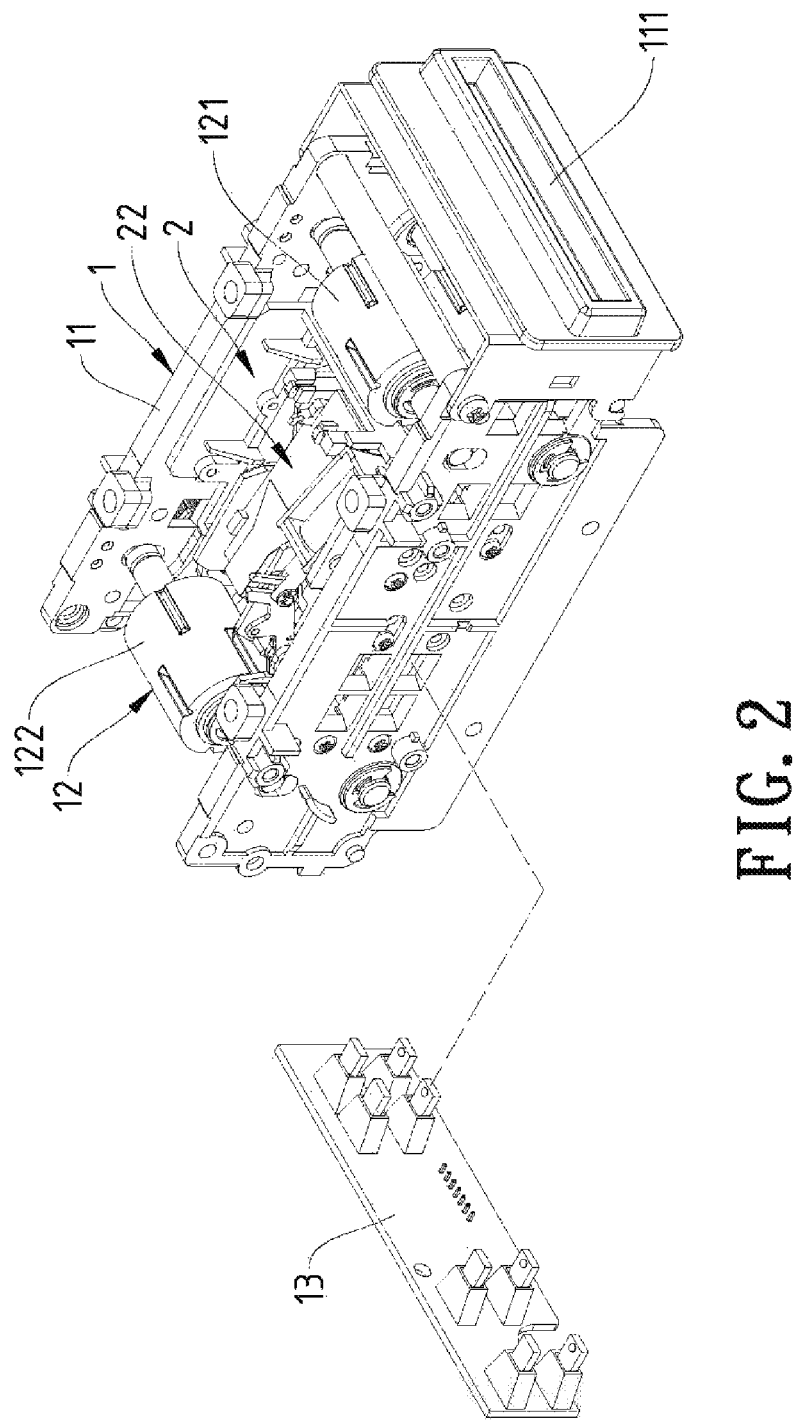
FIG. 2 is a partially exploded perspective view of a card output device of the stored-value card machine of FIG. 1.
Figure 3:
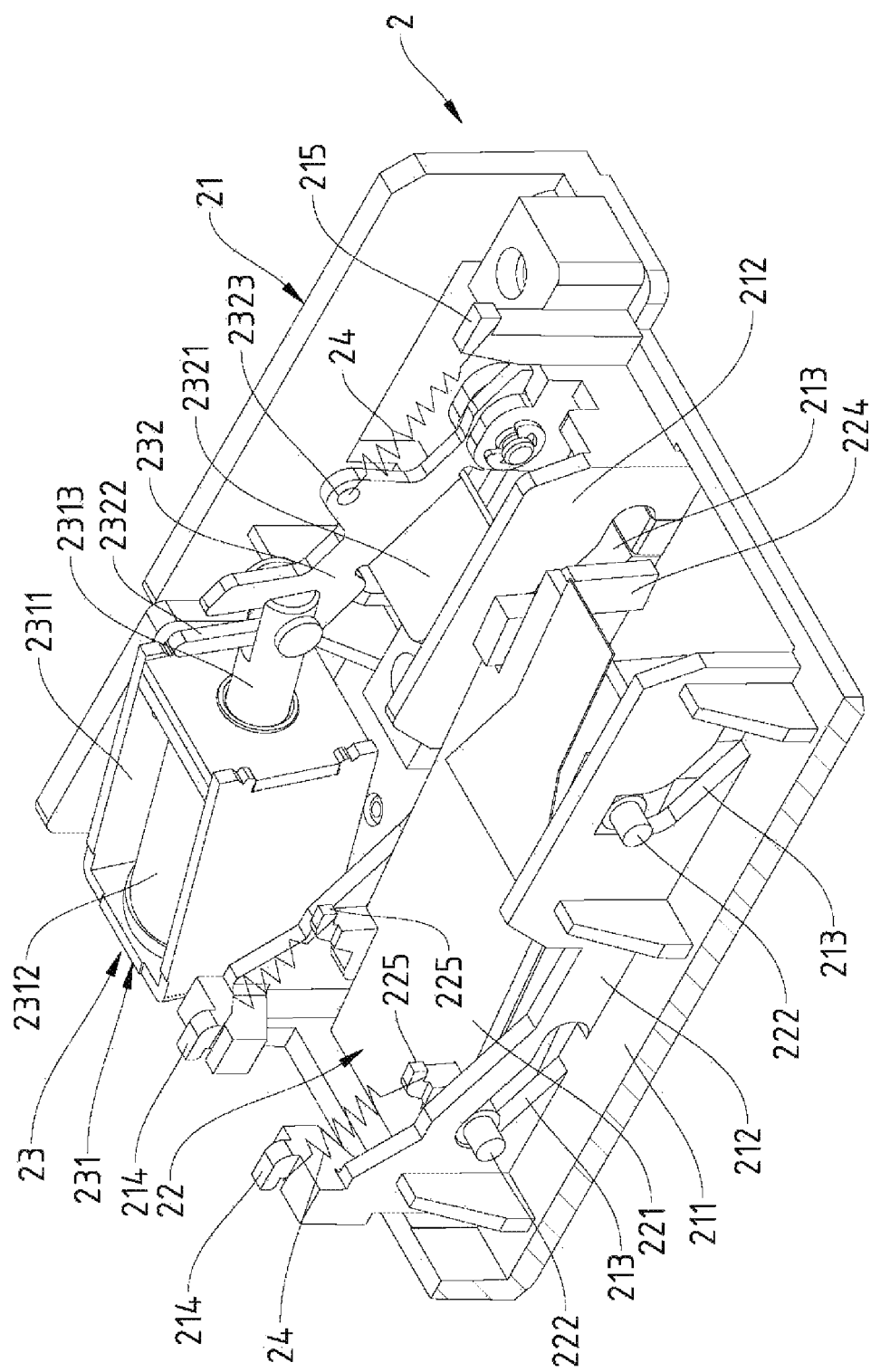
FIG. 3 is a perspective view of a read/write device of the stored-value card machine of FIG. 1.
Figure 4:
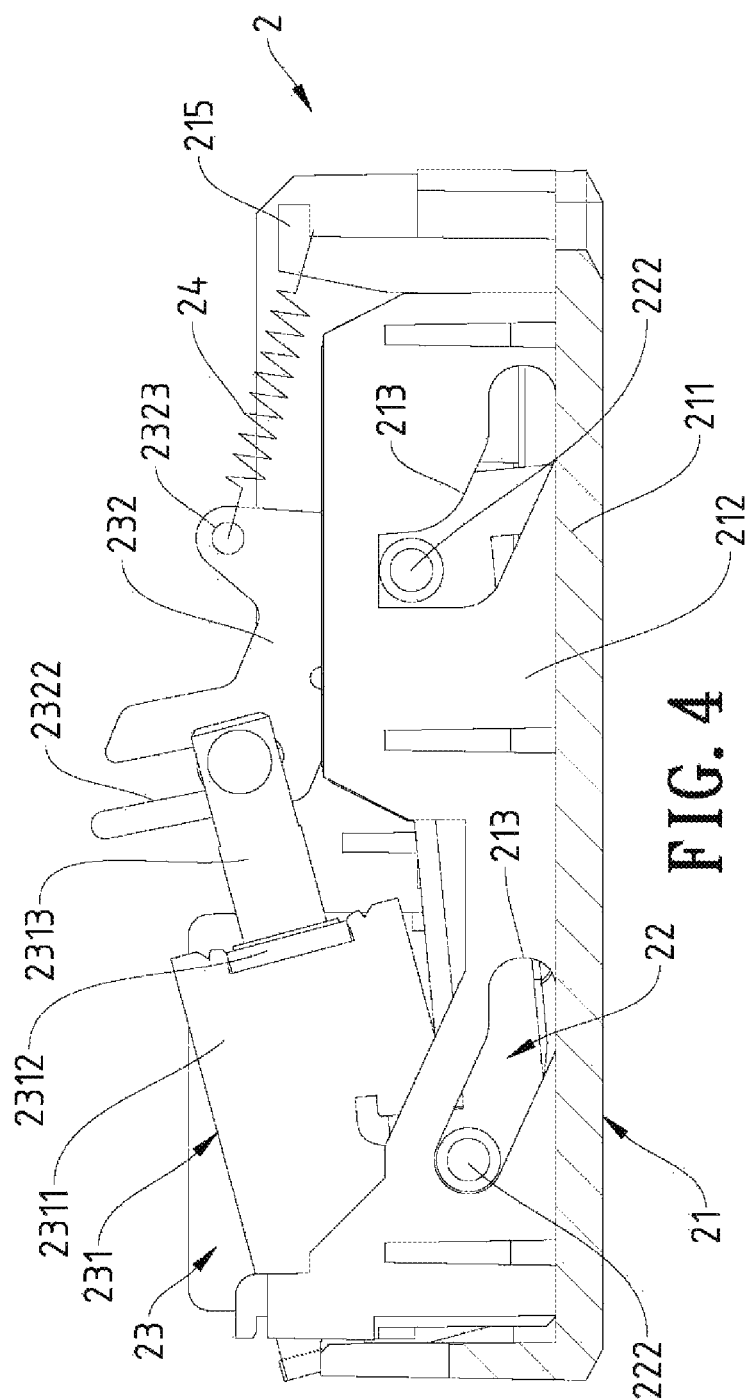
FIG. 4 is a side view of the read/write device of FIG. 3.
Figure 5:
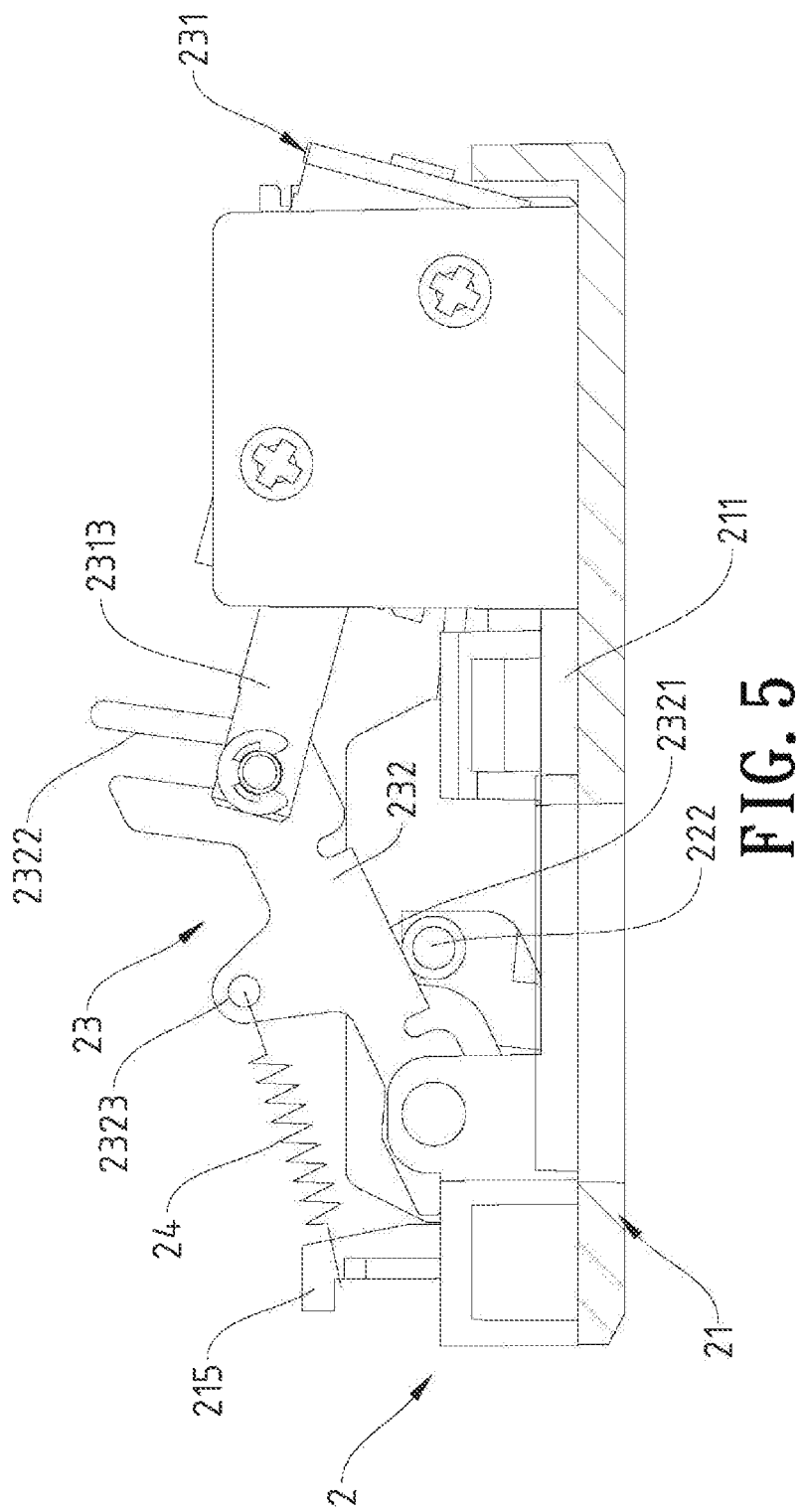
FIG. 5 is another side view of the read/write device of FIG. 3.
Figure 6:
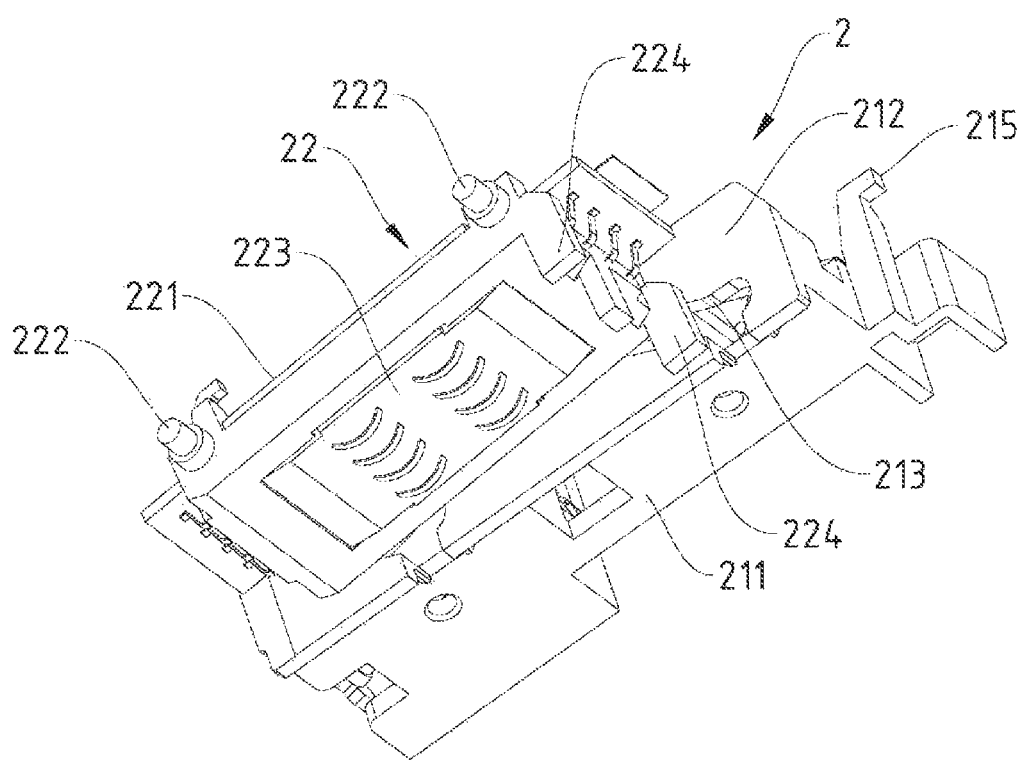
FIG. 6 is a partial, perspective view of the read/write device of FIG. 3.
Figure 7:
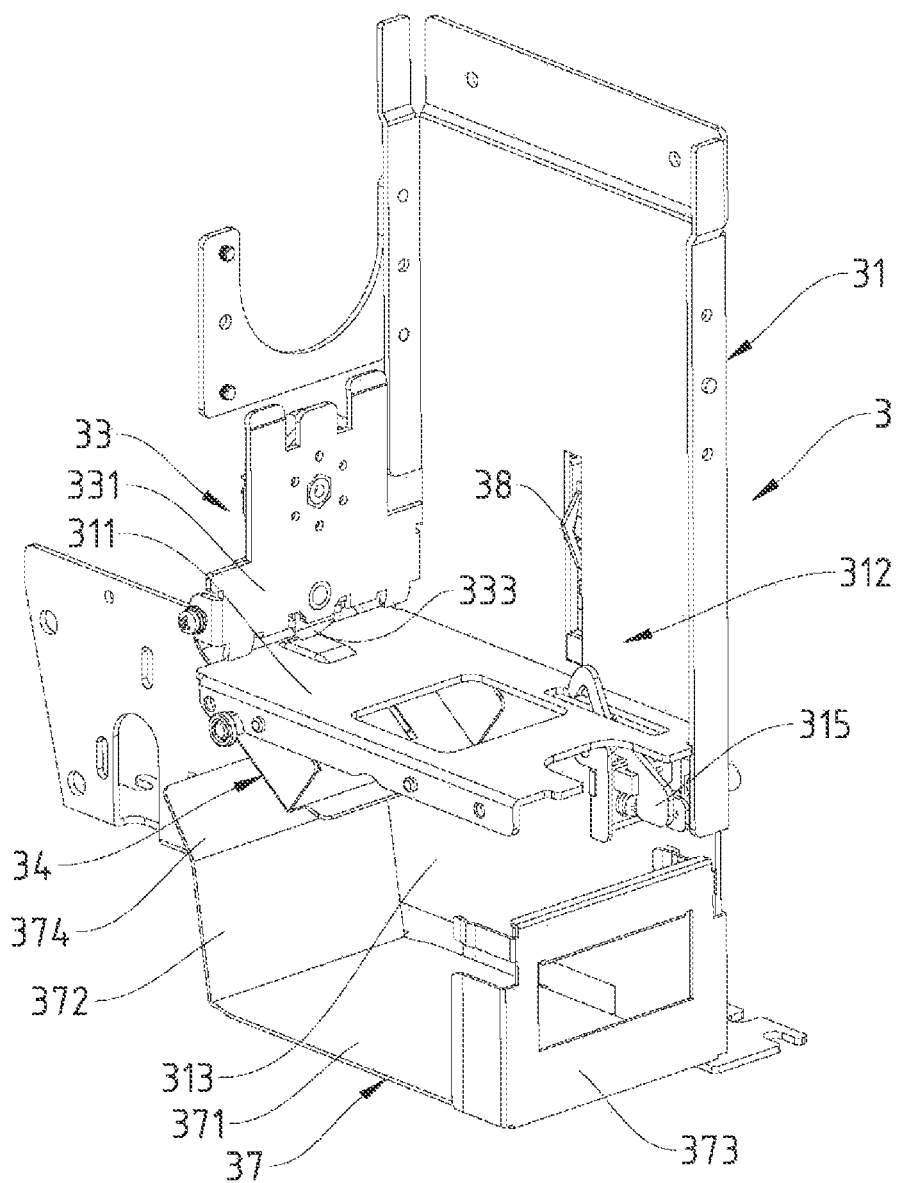
FIG. 7 is a partial, perspective view of a card seat of the stored-value card machine of FIG. 1.
Figure 8:
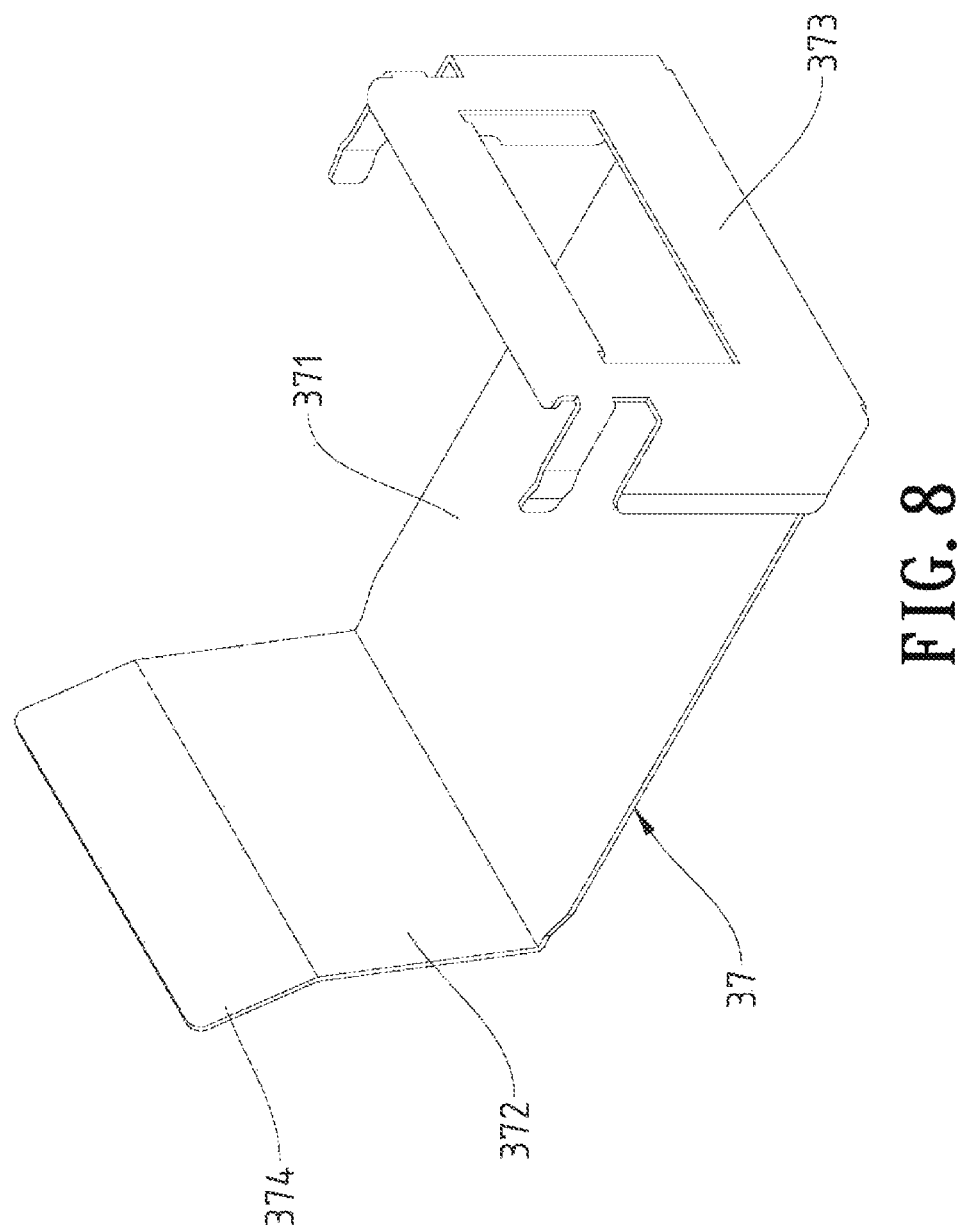
FIG. 8 is a perspective view of a recovery box of the card seat of FIG. 7.
Figure 9:
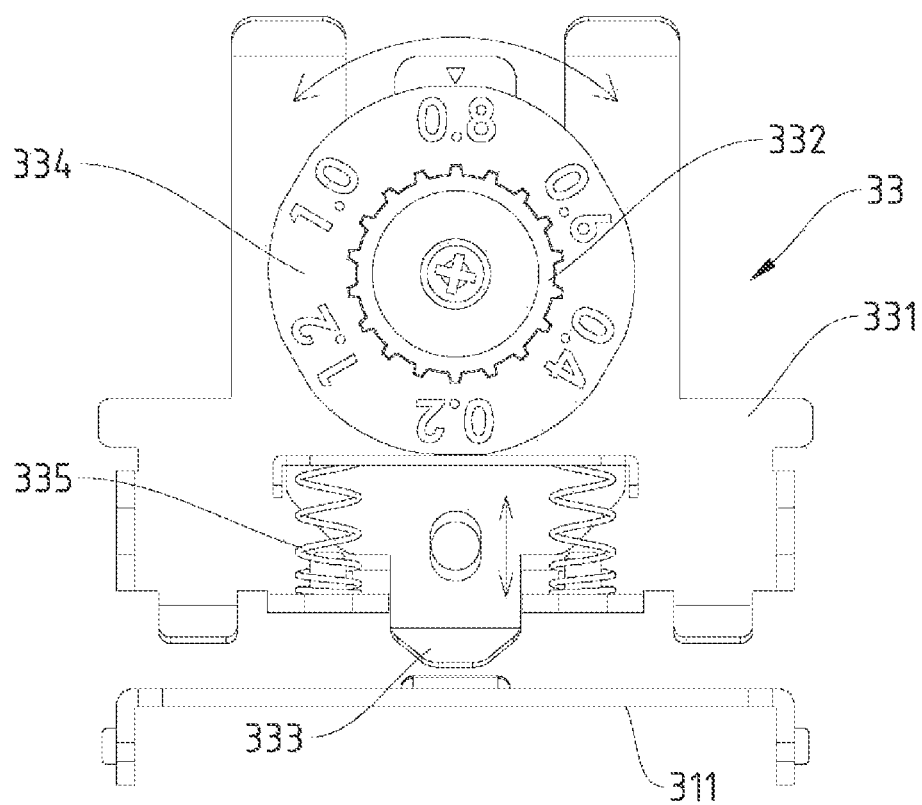
FIG. 9 is a diagrammatic view of an adjusting device of the stored-value card machine of FIG. 1.
Figure 10:
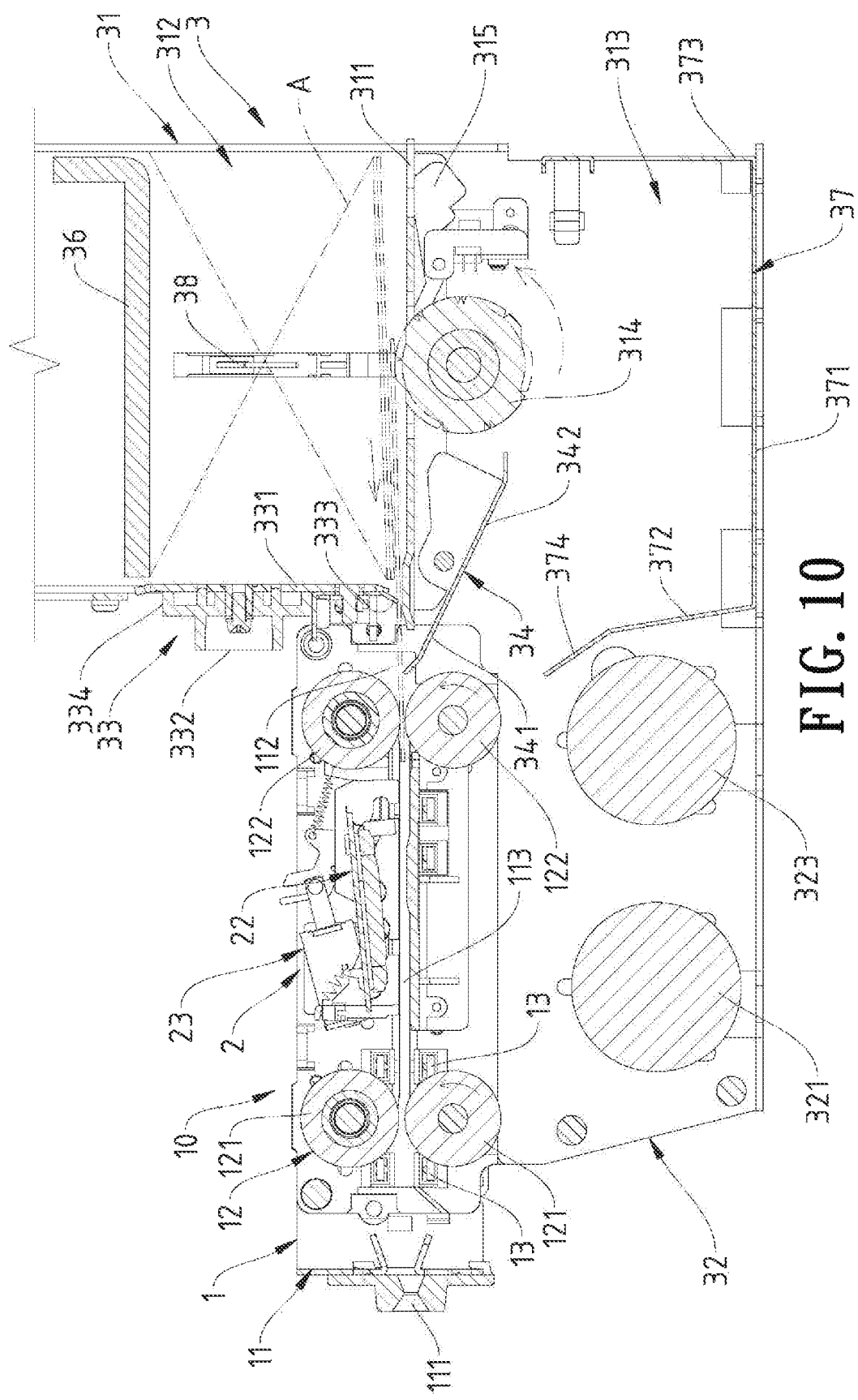
FIG. 10 is a diagrammatic cross sectional view of the stored-value card machine of FIG. 1, illustrating vending of a card.

The body unit 1 includes a body 11 and a transmission device 12 mounted in the body 11 (see FIGS. 1, 2, and 10). The body 11 includes a card outlet 111 in a front end thereof and a card inlet 112 in a rear end thereof. The body 11 further includes a card passageway 113 having two ends intercommunicating with the card outlet 111 and the card inlet 112, respectively. The transmission device 12 includes two front transmission wheels 121 and two rear transmission wheels 122 located at the two ends of the passageway 113, respectively. A detector 13 is mounted at a side of the body 11 and is configured to detect presence of a card A in the card passageway 113.

With reference to FIGS. 2-6 and 9, the read/write device 2 is mounted above an intermediate portion between the two ends of the card passageway 113. The read/write device 2 includes a read/write seat 21, a reader/writer 22 mounted in the read/write seat 21, and a driver 23 mounted in the read/write seat 21. The driver 23 is configured to move the reader/writer 22 downwards into the card passageway 113 or upwards out of the card passageway 113. The read/write seat 21 includes a base 211 (see FIG. 3) and two lateral boards 212 extending upwards from the base 211 and spaced from each other. Each of the two lateral boards 212 includes two guiding holes 213 that are elongated.

The reader/writer 22 is disposed between the two lateral boards 212 and includes a main board 221, two guiding pegs 222 respectively extending from each of two sides of the main board 221, and a read/write head 223 mounted to a bottom face of the main board 221. A stop portion 224 extends downwards from an end of the main board 221. Note that each of the two lateral boards 212 can include only one guiding hole 213, and each of the two sides of the main board 221 can include only one guiding peg 222 received in an associated guiding hole 213. The read/write seat 21 includes two first hooks 214 respectively on the two lateral boards 212. The reader/writer 22 includes two second hooks 225 on the main board 221. Two elastic elements 24 are provided. Each of the two elastic elements 24 is attached between one of the two first hooks 214 and one of the two second hooks 225, biasing the reader/writer 22 upwards.

The driver 23 is disposed on a side of one of the two lateral boards 212 of the read/write seat 21 and includes a driving member 231 and an actuating member 232. The driving member 231 and the actuating member 232 are separately and pivotably connected to the read/write seat 21. An end of the driving member 231 is connected to an end of the actuating member 232. The actuating member 232 includes an actuating portion 2321 pressing against the guiding pegs 232 received in the guiding holes 213 of the one of the two lateral boards 222 (see FIGS. 3 and 5).

The driving member 231 of the read/write device 2 includes a connection seat 2311, an electromagnetic valve 2312, and an actuating rod 2313. The connection seat 2311 is pivotably connected to the read/write seat 21. The electromagnetic valve 2312 is positioned on the connection seat 2313. The actuating rod 2313 is connected to the electromagnetic valve 2312 and is configured to be driven by the electromagnetic valve 2312 to move towards or away from the electromagnetic valve 2312. The actuating member 232 includes an actuating groove 2322 remote to a pivotal connection between the actuating member 232 and the read/write seat 21. An end of the actuating rod 2313 is slidably received in the actuating groove 2322.

The actuating member 232 includes a positioning hole 2323 between two ends thereof. The read/write seat 21 includes a positioning hook 215 adjacent to the pivotal connection between the actuating member 232 and the read/write seat 21. An elastic element 24 is attached between the positioning hook 215 and the positioning hole 2323 to bias the actuating member 232 to pivot upwards.

With reference to FIGS. 1 and 7-10, the card seat 3 includes a card receiving portion 31 and a positioning portion 32 extending from a side of the card receiving portion 31. The card output device 10 is disposed on the positioning portion 32. The card receiving portion 31 includes a partitioning board 311 therein to form a receiving space 312 above the partitioning board 311 and a recovery space 313 below the partitioning board 311. A push wheel 314 is disposed on a bottom face of the partitioning board 311 and is configured to move a card A in the receiving space 312 out of the receiving space 312. The partitioning board 311 is aligned with the card passageway 113.

A first motor 321 and a second motor 323 are disposed in the positioning portion 32. The first motor 321 is connected to the two front transmission wheels 121 and the two rear transmission wheels 122 via a first belt 322. The second motor 323 is connected to the push wheel 314 in the card receiving portion 31 via a second belt 324. A detecting device 315 is mounted to the bottom face of the partitioning board 311 and is configured to detect cards A received in the receiving space 312. A low inventory level detector 38 is mounted at a side of the receiving space 312 and above the partitioning board 311 for detecting an inventory level of the cards A received in the receiving space 312.

An adjusting device 33 is disposed at another side of the receiving space 312 and includes a fixing board 331, a limiting board 333, and an adjusting knob 332. An end of the limiting board 333 is spaced from a surface of the partitioning board 311. The adjusting knob 332 includes a cam 334 having surfaces with different radii. At least one spring 335 is attached to the limiting board 333 to bias the limiting board 333 upwards to abut against a bottom edge of the cam 334. The adjusting knob 332 is configured to move the limiting board 333 vertically to change a spacing between the end of the limiting board 333 and the surface of the partitioning board 311.

A guiding board 34 is pivotably connected to a bottom side of the partitioning board 311 and includes a guiding portion 341 and a recovery portion 342 on two sides of a pivotal connection between the guiding board 34 and the partitioning board 311. The guiding portion 341 extends beyond a top surface of the partitioning board 311 from aside of the partitioning board 311. The recovery portion 342 is located below the partitioning board 311. The gravitational force acting on the recovery portion 342 keeps the guiding portion 341 beyond the top surface of the partitioning board 311.

The card seat 3 includes an upper lid 35 covering a top end of the card receiving portion 31. The upper lid 35 includes an outer stop wall 351 and an inner stop wall 353 which extend vertically from two sides of the upper lid 35, respectively. A pressing board 36 (see FIG. 10) is received in the receiving space 312 and abuts against the cards A in the receiving space 312. A recovery box 37 (see FIGS. 7 and 8) slidably is received in a lower portion of the card receiving portion 31. The recovery box 37 includes a bottom wall 371, a front wall 372 extending upwards from a front side of the bottom wall 371 and a rear wall 373 extending upwards from a rear side of the bottom wall 371. A guiding plate 374 extends slantly from the front wall 372.

With reference to FIGS. 9-18, in sue, cards A are stacked vertically and placed into the receiving space 312, and the pressing board 36 is used to abut against the uppermost card A (see FIG. 10). Thus, the cards A rest on the top surface of the partitioning board 311. Furthermore, the adjusting knob 332 of the adjusting device 33 is used to adjust the spacing between the end of the limiting board 333 and the partitioning board 311 to be slightly larger than a thickness of a card A.

Figure 11:
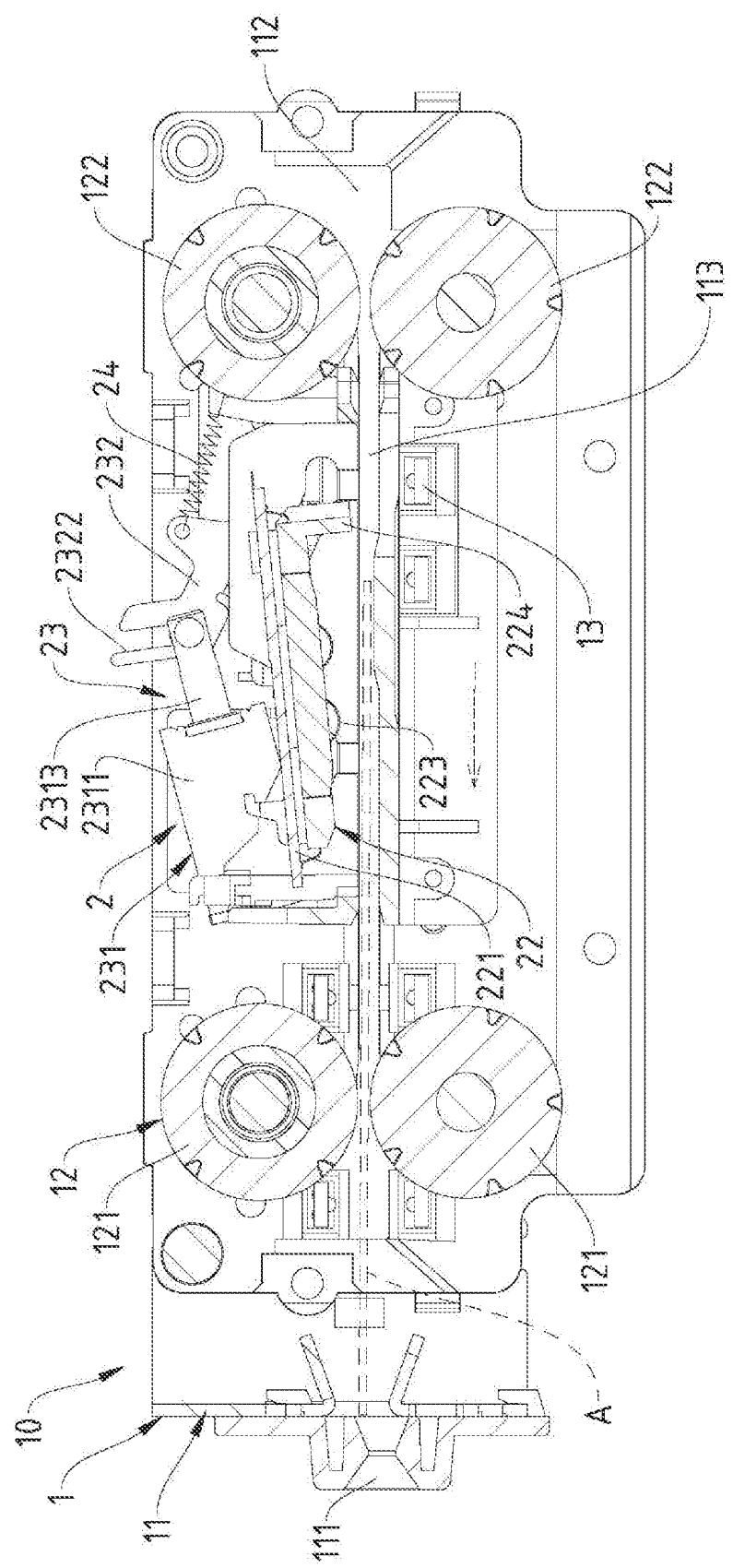
FIG. 11 is an enlarged view of a portion of the stored-value card machine of FIG. 10, illustrating movement of the card through a reader/writer.

With reference to FIGS. 10 and 11, when the card output device 10 outputs a card A, the push wheel 314 moves the card A to pass through the spacing between the end of the limiting board 333 and the partitioning board 311, and the card A enters the card passageway 113 via the card inlet 112. At this time, the two front transmission wheels 121 and the two rear transmission wheels 122 of the transmission device 12 continuously move the card A towards the card outlet 111. When the card A passes a position below the reader/writer 22, the transmission device 12 stops pushing the card A.

Figure 12:
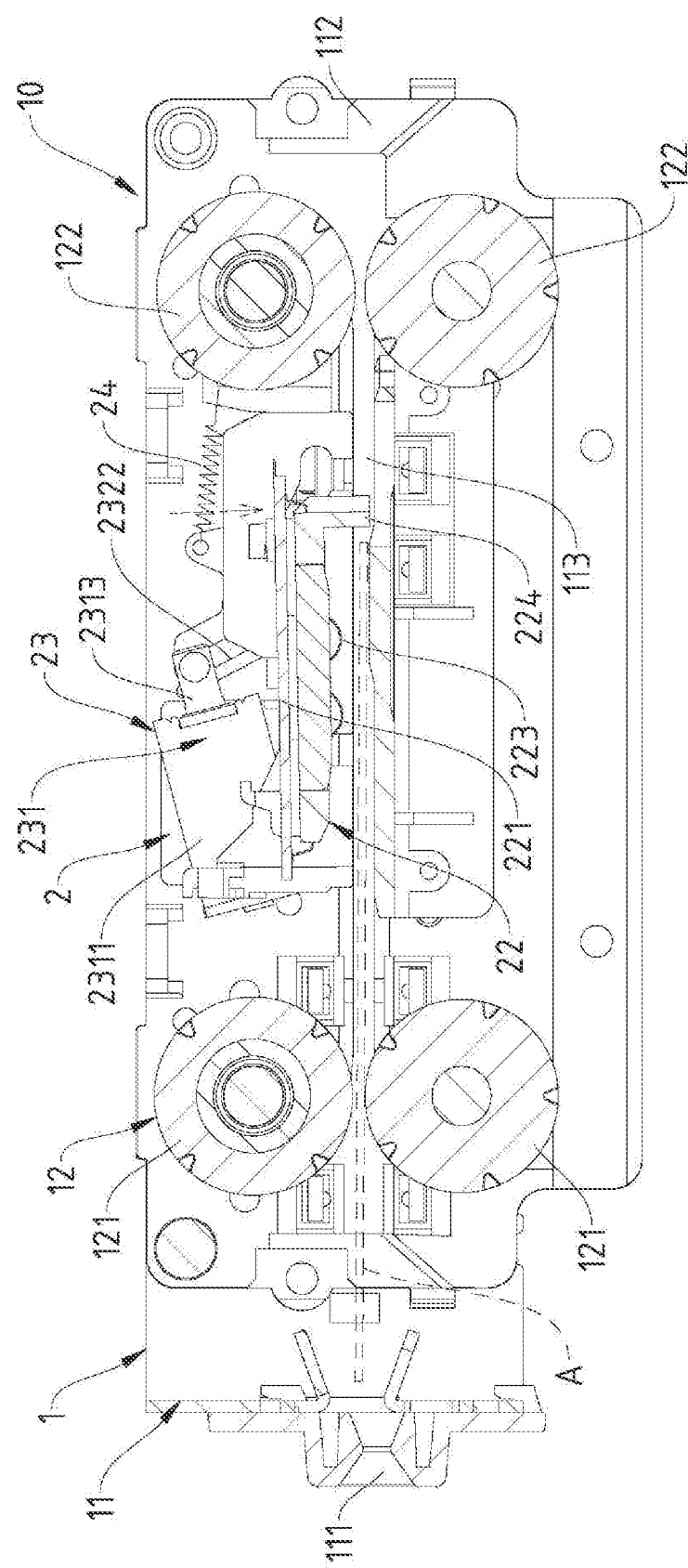
FIG. 12 is a view similar to FIG. 11, illustrating movement of the reader/writer into a card passageway.
Figure 13:
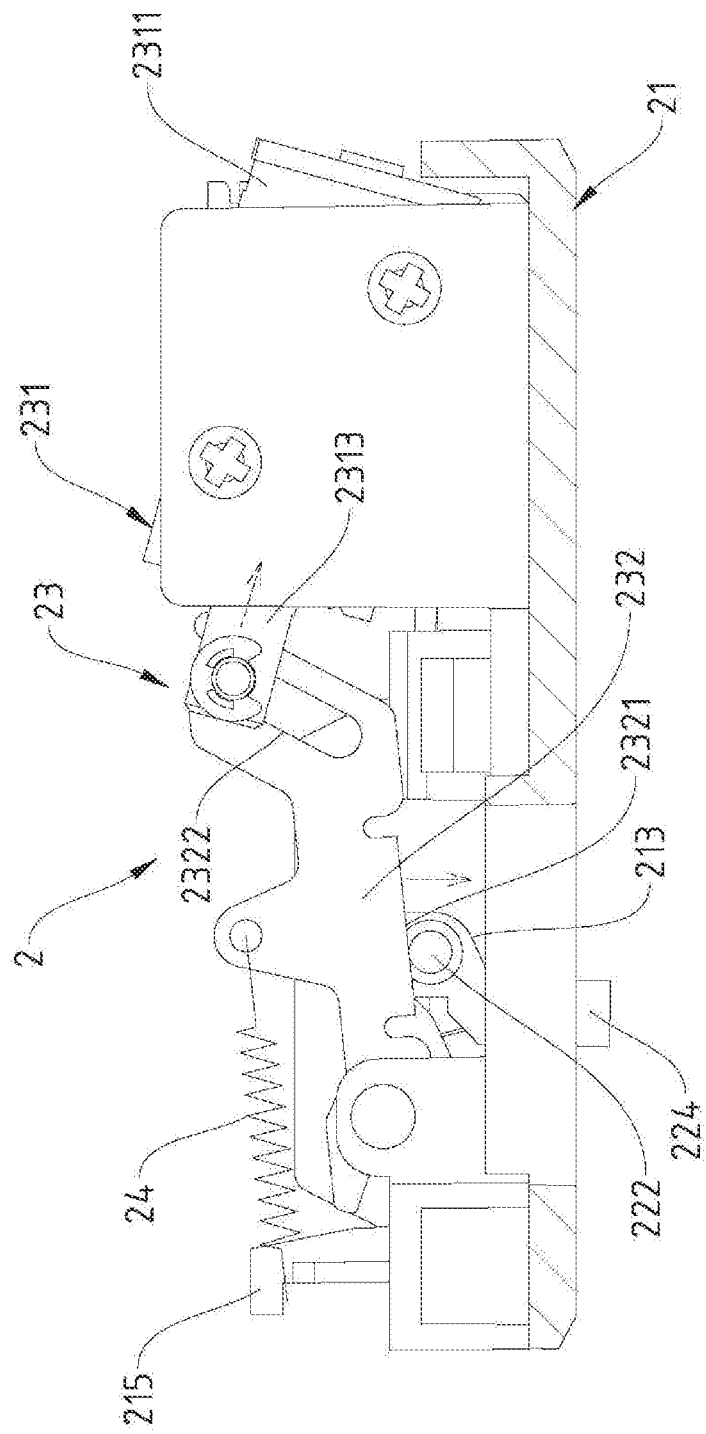
FIGS. 13-15 are diagrammatic views, illustrating movement of the reader/writer through the card passageway.
Figure 14:
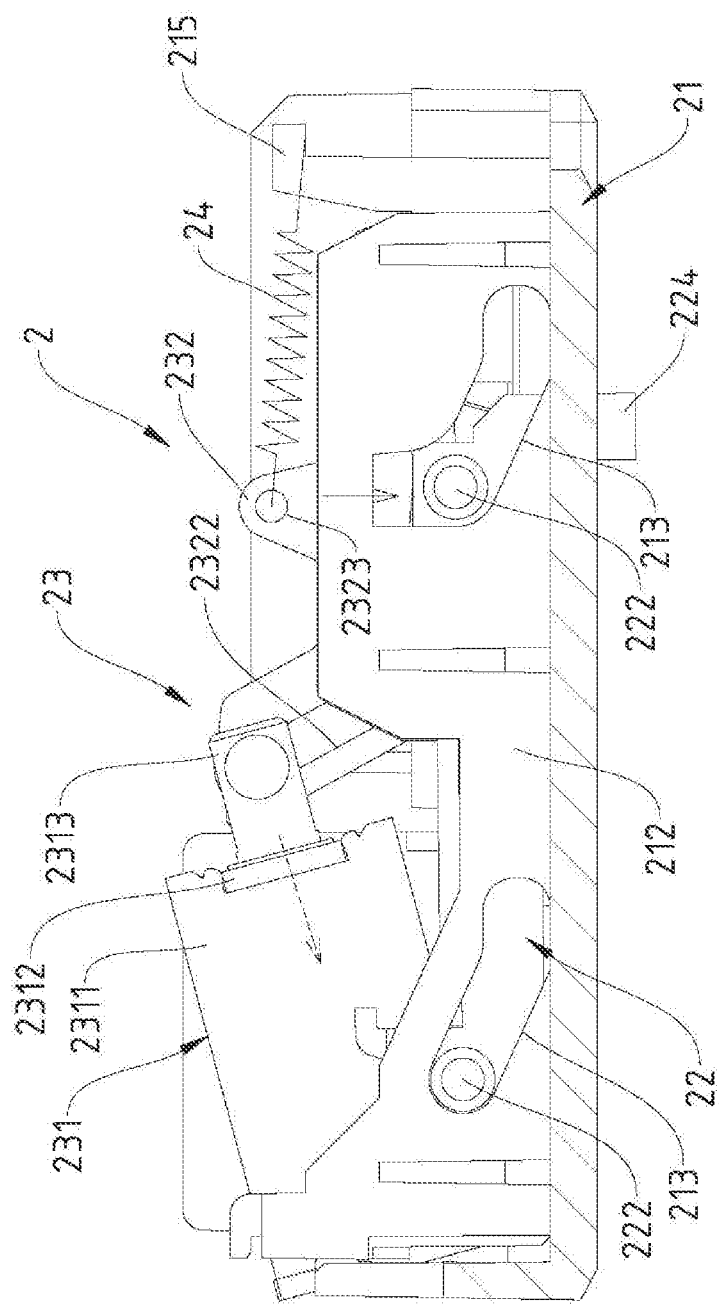

With reference to FIGS. 12-14, after the transmission device 12 stops pushing the card A, the electromagnetic valve 2312 of the driver 23 operates to retract the actuating rod 2313 moving in the actuating groove 2322 and pressing against an inner wall of the actuating groove 2322. The actuating member 232 pivots downwards, such that the actuating portion 2321 (see FIGS. 3 and 13) presses downwards against the associated guiding pegs 222 of the reader/writer 22. Thus, the associated guiding pegs 222 move downwards in the associated guiding holes 213 to move the read/write head 223 and the stop portion 224 into the card passageway 113.

Figure 15:
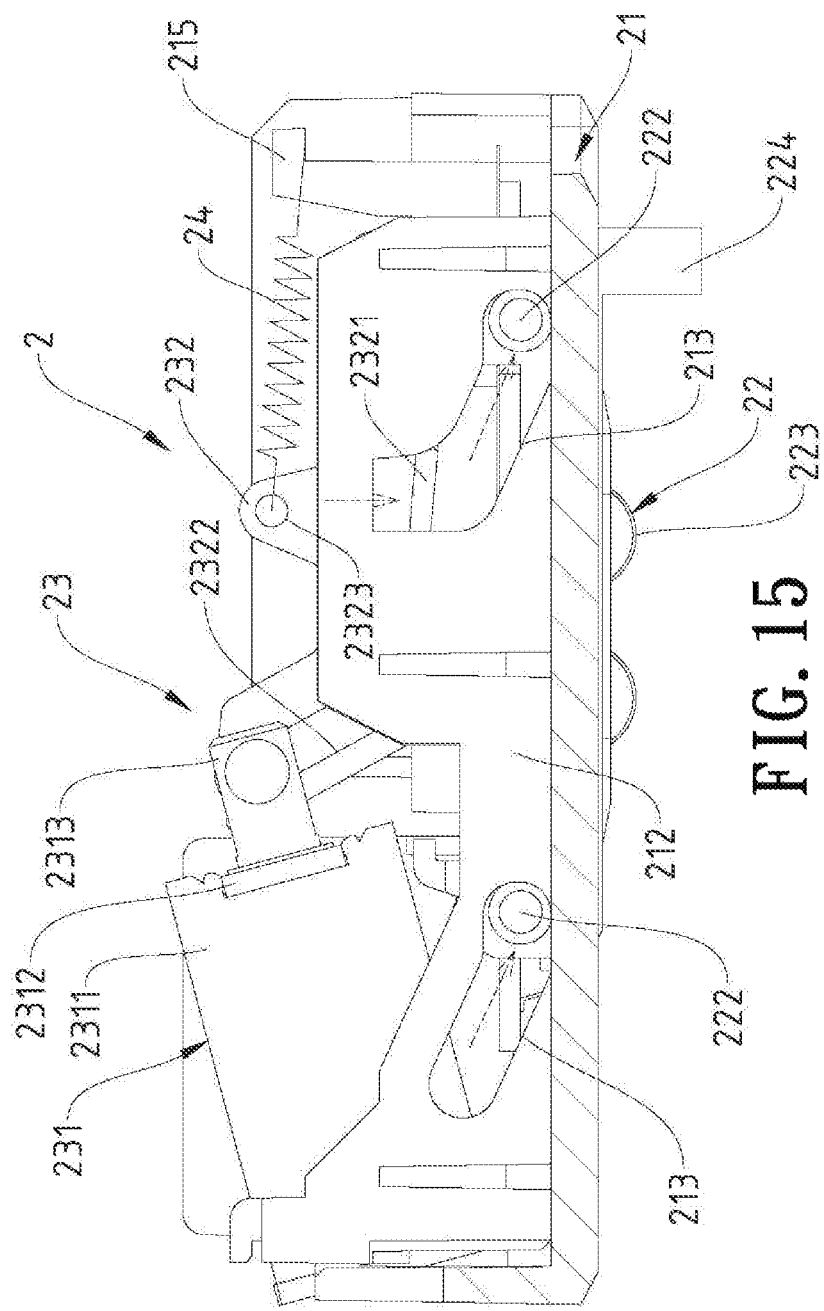
Figure 16:
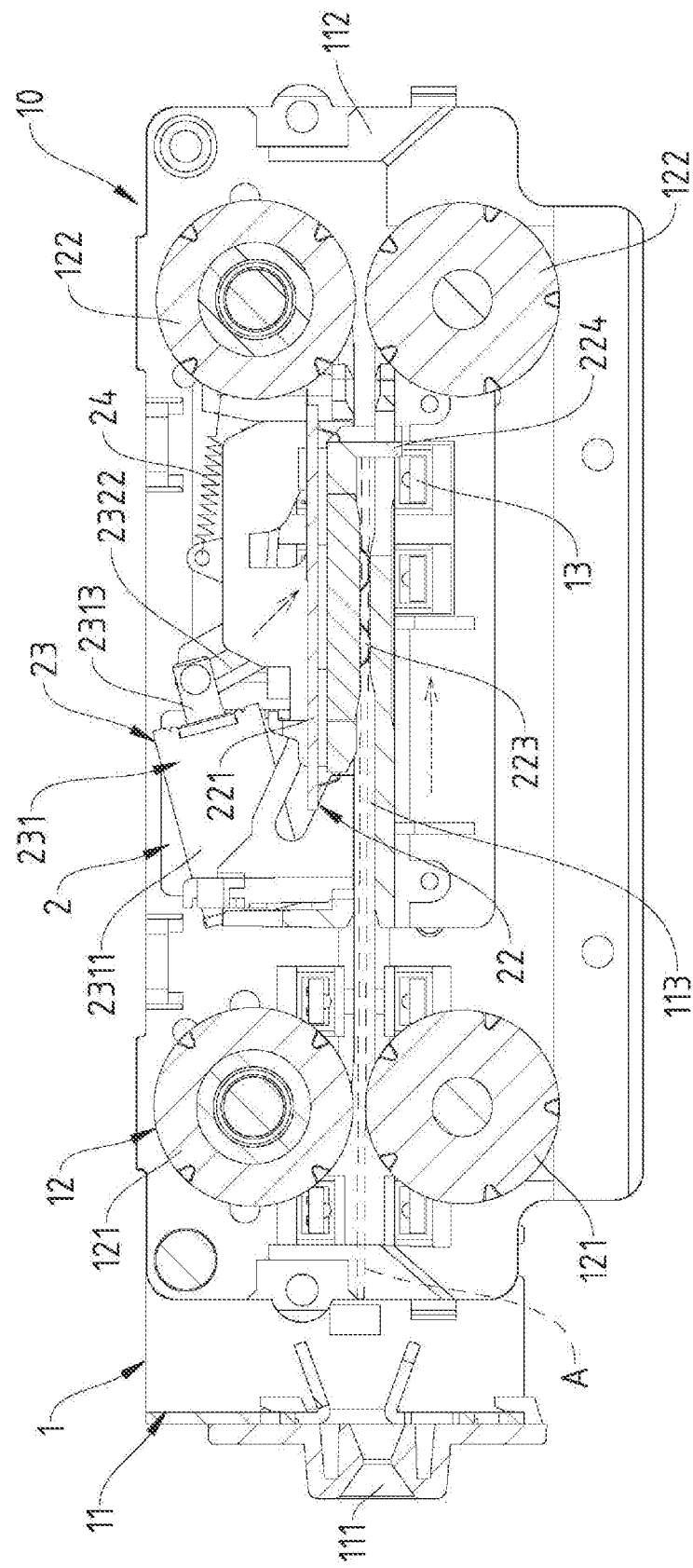
FIG. 16 is a view similar to FIG. 11, with the card pushing the reader/writer backwards to a desired position.
Figure 17:
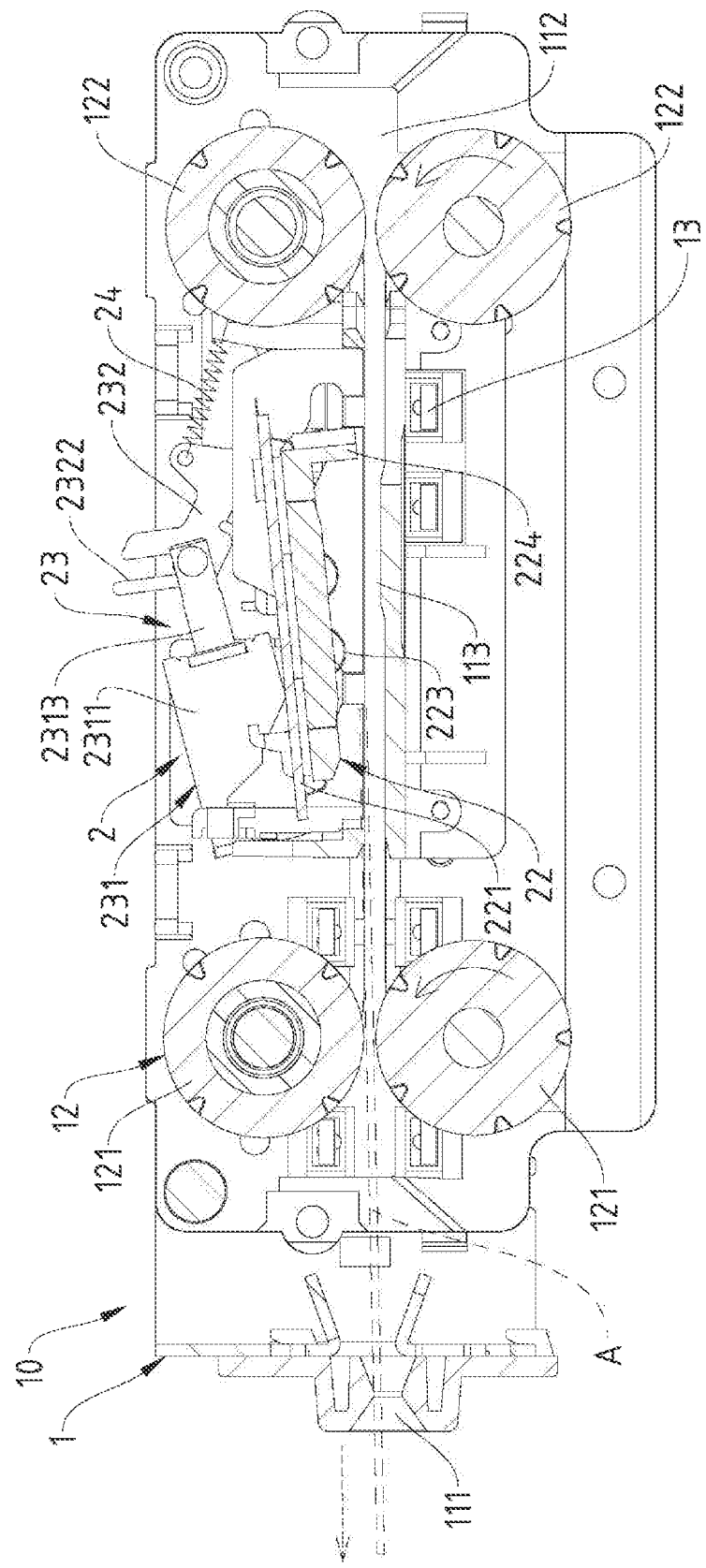
FIG. 17 is a diagrammatic view similar to FIG. 11, illustrating output of the card.

With reference to FIGS. 15-17, after the read/write head 223 and the stop portion 224 move into the card passageway 113, the transmission device 12 pushes the card A towards the card inlet 112. When the card A is stopped by the stop portion 224, the card A pushes the reader/writer 22 backwards to a predetermined position, and the guiding pegs 222 move downwards along the guiding holes 213, such that the reader/writer 22 is permitted to move downwards for precisely contacting with the card A for proceeding with reading and writing, thereby adding value to the card A.

After adding value to the card A, the stored-value card A is moved forwards by the transmission device 12 and exits the card outlet 111.

Furthermore, after use of the card A, reading and writing can be conducted on the card A to proceeding with value adding. Specifically, the card A is inserted by a user into the card outlet 111, the electromagnetic valve 2312 of the driver 23 operates to move the read/write head 223 and the stop portion 224 into the card passageway 113. The transmission device 12 pushes the card A towards the card inlet 112. When the card A is stopped by the stop portion 224, the card A pushes the reader/writer 22 backwards to a predetermined position, such that the reader/writer 22 is permitted to move downwards for precisely contacting with the card A for proceeding with reading and writing, thereby adding value to the card A.

Figure 18:
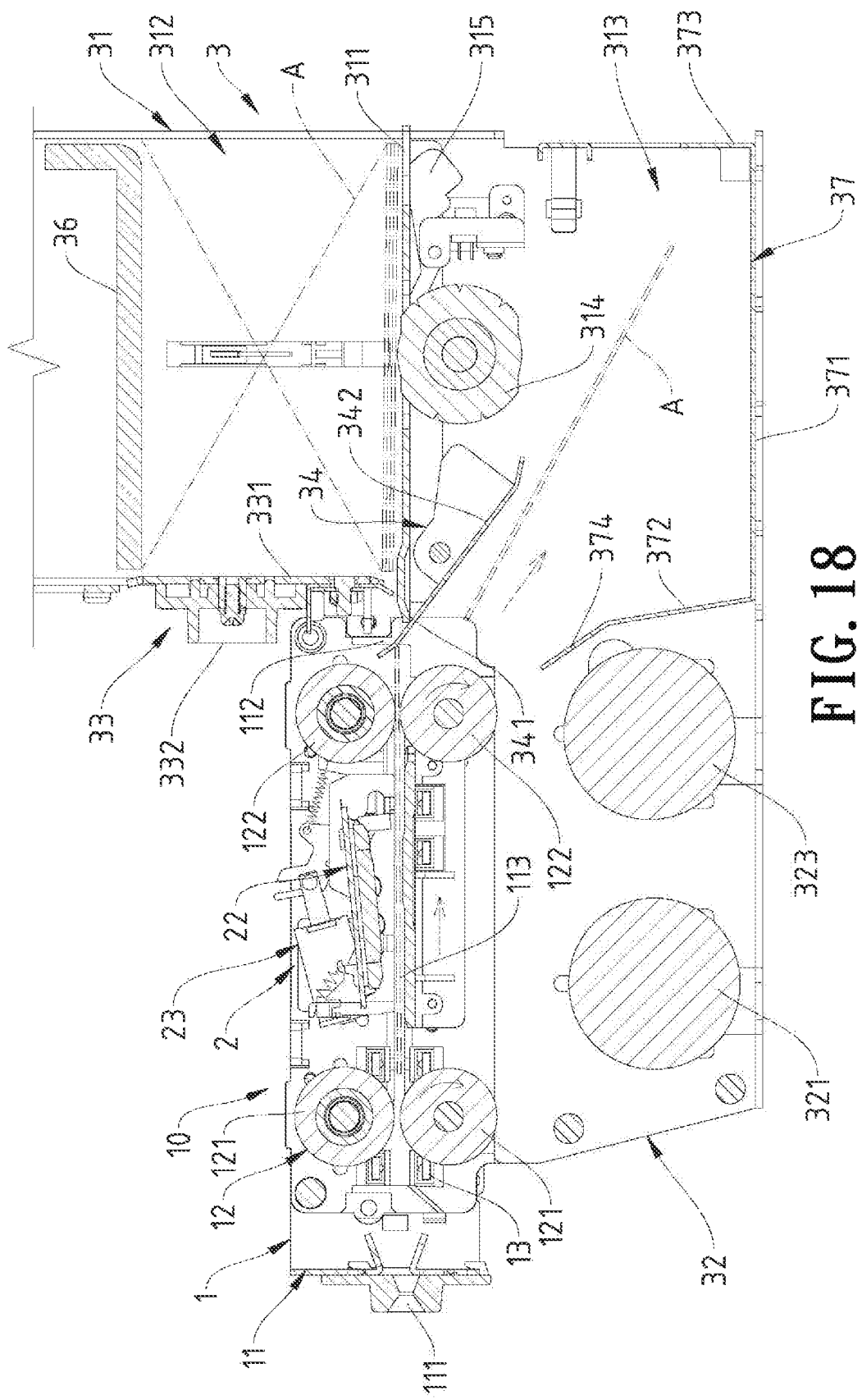
FIG. 18 is a diagrammatic view similar to FIG. 10, illustrating recovery of the card.

With reference to FIG. 18, when the read/write head 223 cannot proceed with reading and writing of the card A (namely, the card A is damaged), the transmission device 12 pushes the card A towards the card inlet 112. The card A is restricted by the guiding portion 341 and is guided by the guiding plate 374 to fall into the recovery space 313. A detector can be disposed on aside of the recovery space 313 to detect the amount of recovered cards A and to inform a manager to open and retrieve the recovery box 37 and the recovered cards A.

Although specific embodiments have been illustrated and described, numerous modifications and variations are still possible without departing from the scope of the invention. The scope of the invention is limited by the accompanying claims.

The invention claimed is:

1. A stored-value card machine comprising a card output device including:
   a body unit including a body and a transmission device mounted in the body, wherein the body includes a card outlet in a front end thereof and a card inlet in a rear end thereof, wherein the body further includes a card passageway having two ends intercommunicating with the card outlet and the card inlet, respectively, and wherein the transmission device includes two front transmission wheels and two rear transmission wheels located at the two ends of the passageway, respectively; and
   a read/write device mounted above an intermediate portion between the two ends of the card passageway, wherein the read/write device includes a read/write seat, a reader/writer mounted in the read/write seat, and a driver mounted in the read/write seat, and wherein the driver is configured to move the reader/writer downwards into the card passageway or upwards out of the card passageway;
   wherein before the card output device outputs a card, the driver moves the reader/writer upwards out of the card passageway, wherein after the card enters the card passageway via the card inlet, the transmission device pushes the card towards the card outlet, wherein after the card passes through the reader/writer, the transmission device stops pushing the card, and the driver is activated to move the reader/writer downwards into the card passageway, then the transmission device moves the card towards the card inlet, thereby moving the card backwards to push the reader/writer to a position where the reader/writer is permitted to move downwards for precisely contacting with the card for proceeding with reading and writing.

2. The stored-value card machine as claimed in claim 1, wherein the body unit further includes a detector mounted at a side of the body and configured to detect presence of the card in the card passageway.

3. The stored-value card machine as claimed in claim 1, wherein the read/write seat includes a base and two lateral boards extending upwards from the base and spaced from each other, wherein each of the two lateral boards includes a guiding hole that is elongated, wherein the reader/writer is disposed between the two lateral boards and includes a main board, two guiding pegs respectively extending from two sides of the main board, and a read/write head mounted to a bottom face of the main board, wherein a stop portion extend downwards from an end of the main board, wherein when the driver moves the reader/writer downwards, the read/write head and the stop portion enters the card passageway, such that the card pushes the stop portion towards the card inlet and is positioned, and the read/write head moves downwards to contact with the card and proceeds with reading and writing.

4. The stored-value card machine as claimed in claim 3, wherein the read/write seat includes two first hooks respectively on the two lateral boards, wherein the reader/writer includes two second hooks on the main board, wherein two elastic elements are provided, and wherein each of the two elastic elements is attached between one of the two first hooks and one of the two second hooks, biasing the reader/writer upwards.

5. The stored-value card machine as claimed in claim 3, wherein the driver is disposed on a side of one of the two lateral boards of the read/write seat, wherein the driver includes a driving member and an actuating member, wherein the driving member and the actuating member are separately and pivotably connected to the read/write seat, wherein an end of the driving member is connected to an end of the actuating member, wherein the actuating member includes an actuating portion pressing against the guiding peg received in the guiding hole of the one of the two lateral boards, wherein when the driver drives the actuating member to pivot downwards, the actuating portion presses against and moves the guiding peg downwards along the guiding hole.

6. The stored-value card machine as claimed in claim 5, wherein the driving member of the read/write device includes a connection seat, an electromagnetic valve, and an actuating rod, wherein the connection seat is pivotably connected to the read/write seat, wherein the electromagnetic valve is positioned on the connection seat, wherein the actuating rod is connected to the electromagnetic valve and is configured to be driven by the electromagnetic valve to move towards or away from the electromagnetic valve, wherein the actuating member includes an actuating groove remote to a pivotal connection between the actuating member and the read/write seat, and wherein an end of the actuating rod is slidably received in the actuating groove.

7. The stored-value card machine as claimed in claim 5, wherein the actuating member includes a positioning hole between two ends thereof, wherein the read/write seat includes a positioning hook adjacent to the pivotal connection between the actuating member and the read/write seat, wherein an elastic element is attached between the positioning hook and the positioning hole to bias the actuating member to pivot upwards.

8. The stored-value card machine as claimed in claim 1, further comprising a card seat including a card receiving portion and a positioning portion extending from a side of the card receiving portion, wherein the card output device is disposed on the positioning portion, wherein the card receiving portion includes a partitioning board therein to form a receiving space above the partitioning board and a recovery space below the partitioning board, wherein the receiving space is configured to receive a plurality of cards, wherein the recovery space is configured to receive damaged cards, wherein a push wheel is disposed on a bottom face of the partitioning board and is configured to move one of the plurality of cards in the receiving space out of the receiving space, wherein the partitioning board is aligned with the card passageway, wherein a first motor and a second motor are disposed in the positioning portion, wherein the first motor is connected to the two front transmission wheels and the two rear transmission wheels via a first belt, and wherein the second motor is connected to the push wheel in the card receiving portion via a second belt.

9. The stored-value card machine as claimed in claim 8, wherein the card seat includes a detecting device mounted to the bottom face of the partitioning board and configured to detect the plurality of cards received in the receiving space, and wherein a low inventory level detector is mounted at a side of the receiving space and above the partitioning board for detecting an inventory level of the plurality of cards received in the receiving space.

10. The stored-value card machine as claimed in claim 8, wherein an adjusting device is disposed at another side of the receiving space and includes a fixing board, a limiting board, and an adjusting knob, wherein an end of the limiting board is spaced from a surface of the partitioning board, wherein the adjusting knob includes a cam having surfaces with different radii, wherein at least one spring is attached to the limiting board to bias the limiting board upwards to abut against a bottom edge of the cam, wherein the adjusting knob is configured to move the limiting board vertically to change a spacing between the end of the limiting board and the surface of the partitioning board.

11. The stored-value card machine as claimed in claim 8, wherein a guiding board is pivotably connected to a bottom side of the partitioning board and includes a guiding portion and a recovery portion on two sides of a pivotal connection between the guiding board and the partitioning board, wherein the guiding portion extends beyond a top surface of the partitioning board from a side of the partitioning board, wherein the recovery portion is located below the partitioning board, and wherein a gravitational force acting on the recovery portion keeps the guiding portion beyond the top surface of the partitioning board.

12. The stored-value card machine as claimed in claim 8, wherein the card seat includes an upper lid covering a top end of the card receiving portion, and wherein a pressing board is received in the receiving space and abuts against the cards in the receiving space.

13. The stored-value card machine as claimed in claim 8, wherein the card seat includes a recovery box slidably received in a lower portion of the card receiving portion, wherein the recovery box includes a bottom wall, a front wall extending upwards from a front side of the bottom wall and a rear wall extending upwards from a rear side of the bottom wall, and wherein a guiding plate extends slantly from the front wall.

\* \* \* \* \*